Inventor:
Francisc C. Schwarz,
by Dudley J. Ready
His Agent.

United States Patent Office 3,303,405
Patented Feb. 7, 1967

3,303,405
FREQUENCY MODULATED SELF-STABILIZING INVERTER
Francisc C. Schwarz, Ithaca, N.Y., assignor to General Electric Company, a corporation of New York
Filed Aug. 1, 1963, Ser. No. 299,423
1 Claim. (Cl. 321—2)

This invention relates to an improved amplifier of the inverter type which provides a stabilized output in the presence of supply voltage and load variations. With only a small fraction of the switching losses of conventional circuits, the invention substantialy reduces the frequency limitations normaly encountered. It is particularly useful for D.C. to A.C. conversion.

Inversion in general is an established technique in the field of voltage regulation. It has been justified primarily because it eliminates the D.C. drop in a dissipative series-regulating devices, with the undesirable problems of efficiency, heat, and often reliability. However, stabilizing inverters have generally suffered from loss due to forced turn off of the electronic switches and from losses due to commutation currents—switching currents in the power circuit which are not directly useful in applying power to the load.

The process of inversion to frequencies of operation that are higher than those found in ground-operated (50/60 c.p.s.) and airborne (400 c.p.s.) alternator sources has become the classical attack on the size of power transformers which implement the desired voltage level change. It is noted that this is only a partial attack on the weight problem, since the source ripple is usually not adequately affected by this inversion process.

The degree of effectiveness of inversion with respect to weight will depend to a large extent on the supply source character. It reduces the weight of a power supply fed from a rectified three-phase 400-c.p.s. source more effectively than that fed from a rectified single-phase 50-c.p.s. source, because of the substantial difference in ripple content. The problem of filtering can overshadow the problem of transformer size in the latter case. It also raises the question as to what extent the complexity of an inversion operation is justified if it remedies only some sources of bulk in power supplies of that kind.

Accordingly, it is an object of the invention to provide a stabilizing inverter in which the power lost in the inverter switches is substantialy reduced to the conduction losses during which power is actualy delivered to the load.

It is a further object of the invention to provide a stabilizing inverter in which the power source ripple is effectively suppressed.

Briefly stated, in accordance with certain aspects of the invention, a novel voltage stabilizing amplifier of the pulse modulation type is provided in which a D.C. source is frequency modulated into a train of alternating polarity pulses. This is achieved by arrangements which cause stabilization through control of the average number of pulses applied to the load in accordance with the average volt-time signal amplitude actually delivered while never permitting significant currents without the load being coupled to the source of power. The control operation is through varying the down time between half cycles while avoiding both the turn-off of electronic switches carrying large currents and the presence of commutation curents after disconnecting the load during each half cycle. It has been discoverd that this leads to true power stabilization in addition to voltage stabilization and permits active filter operation.

These and other objects and features of this invention will become apparent from the accompanying detailed description and drawings in which.

Figure 1:
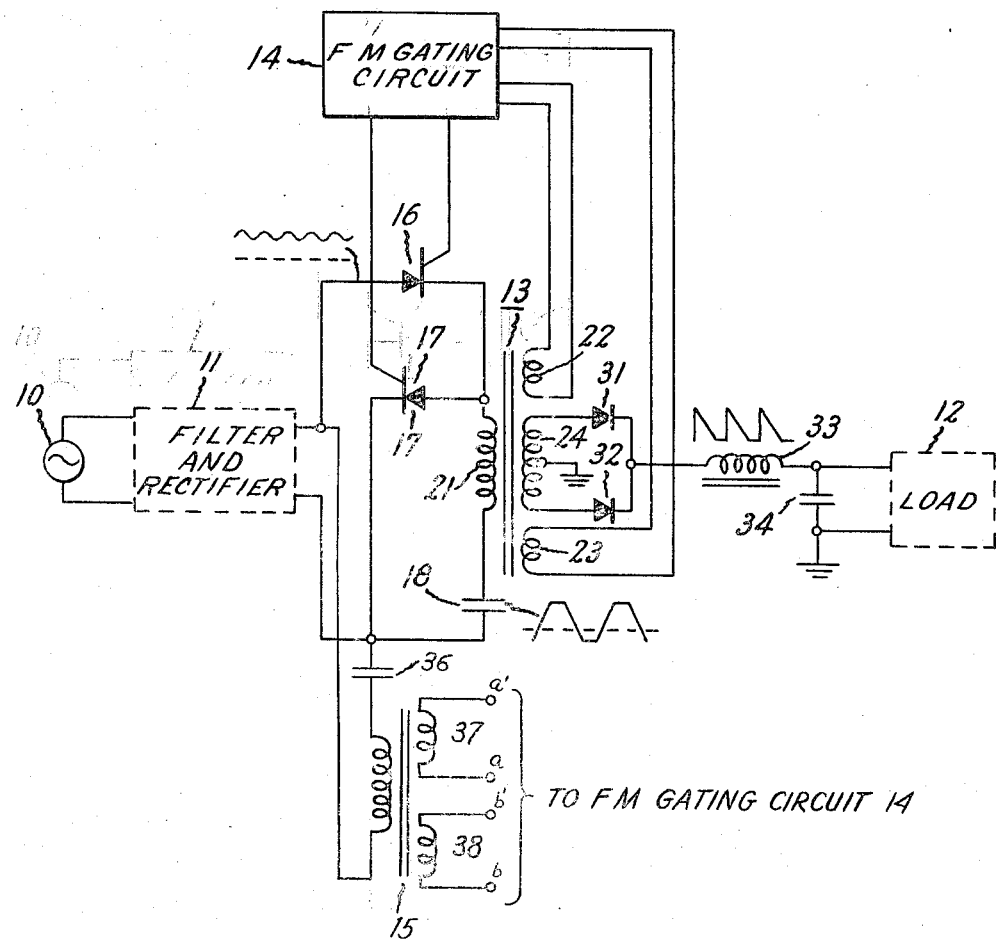
FIGURES 1 and 2 are schematic diagrams of an embodiment of the invention.

Referring now to the drawings, FIGURE 1 illustrates a first embodiment of the inverter invention which is useful as a voltage stabilizer. A source of A.C. power 10 for a load 12 is voltage stabilized through novel pulse modulation, after A.C. to D.C. conversion in rectifier and filter circuit 11. The output of circuit 11 is inverted in accordance with invention and the resulting stabilized pulse train from transformer 13 is rectified by rectifiers 31 and 32, and filtered by choke 33 and capacitor 34. For the first half cycle, a pulse is initiated by FM gating circuit 14 applying a pulse to the gate of a silicon controlled rectifier 16. This closes a series circuit from filter-rectifier circuit 11 through primary winding 21 of transformer 13 and a series storage capacitor 18. A pulse is induced in the secondary winding 24 which is applied to load 12. During this portion of the first half cycle $T_1$, capacitor 18 is being charged. Because of the inductance of transformer 13 and choke 33, the capacitor charges with a ramp waveform. The circuit inductances also cause the voltage across capacitor 18 to overshoot the input voltage until the magnetic fields collapse. At this point conduction ceases and controlled rectifier 16 turns "off" because of back bias in the usual manner. By this operation, the electronic switching element is turned "off" without power dissipation due to either sharp turn off or commutation currents.

The second half cycle $T_2$ is essentially the converse of the first half cycle. The FM gate circuit 14 initiates the negative half cycle by aplying a pulse to the gate of silicon controlled rectifier 17. This closes the series circuit for discharging storage capacitor 18 through primary winding 21 of transformer 13. The discharge of storage capacitor 18 produces a negative load winding pulse and overshoots the discharged state because of the circuit inductance. As a result, the voltage across capacitor 18 reverses polarity and causes the controlled rectifier 17 to be turned "off" by the reverse bias in the same manner as controlled rectifier 16.

Figure 2:
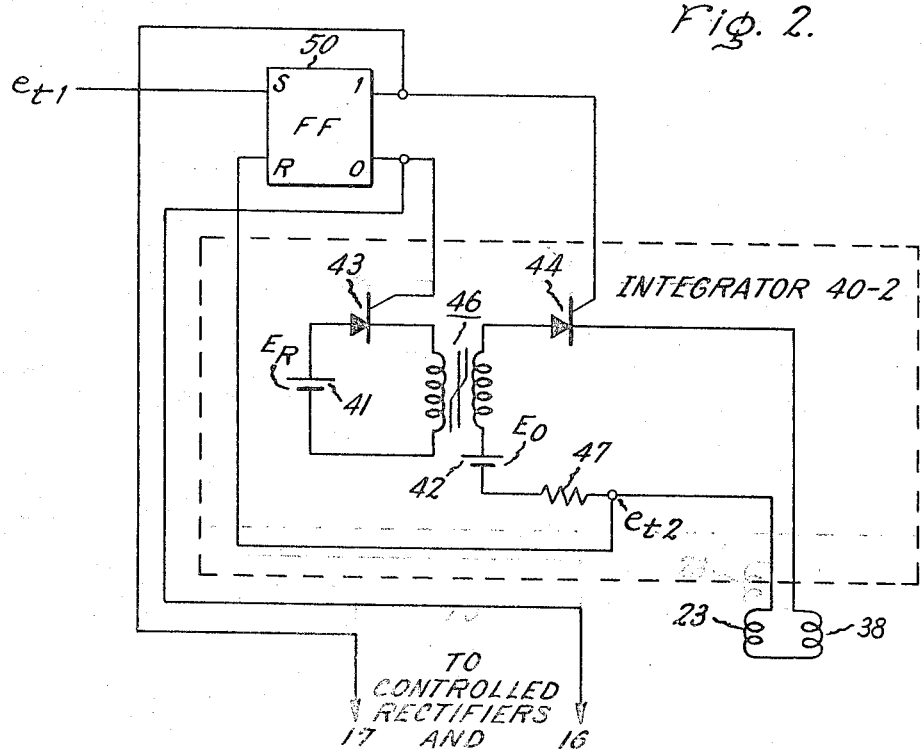
Figure 3:
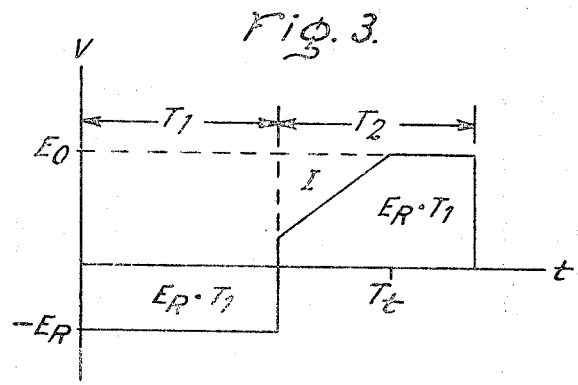
FIGURE 3 is a waveform diagram illustrating the operation of the FIGURE 2 circuit.

FIGURE 2 illustrates portions of the frequency modulation (FM) gating circuit 14 of FIGURE 1 and FIGURE 3 is a waveform illustrating the operation of the FIGURE 2 circuit. A set-reset flip-flop 50 is provided to gate controlled rectifiers 16 and 17 in accordance with the "0" and "1" outputs, respectively. Flip-flop 50 together with integrator 40–2 and identical integrator 40–1 (not shown) operate as a relaxation oscillator in which the frequency is varied to provide the voltage stabilized operation of the inverter. During the first half cycle $T_1$, the integrator 40–2 is set by a reference voltage source 41. The "0" output of flip-flop 50 turns on turn-off type controlled rectifier 43 to provide a closed circuit to the integrator element, saturable transformer 46. During $T_1$, the saturable transformer is driven towards saturation in a set direction and accumulates a volt-time integral $E_R \cdot T_1$. While integrator 40–2 is being set, integrator 40–1 (not shown) is being reset, which determines the duration of $T_1$. At the end of the first half cycle, flip-flop 50 is set by the signal $e_{t1}$ from integrator 40–1. This starts the second half cycle $T_2$ during which the set switch, controlled rectifier 43, is turned off with the switching of flip-flop 50 to the "1" state. At the same time, turn-off type controlled rectifier 44 is turned on by the "1" output and integrator 40–2 is reset by reference voltage source 42. The reset time, the duration of the second half cycle $T_2$, is the time required to empty the integrator element, that is, the time to saturate saturable reactor 46 in the rest direction. This time is made variable because the reference voltage $E_o$ is opposed by a control voltage from winding 23 on transformer 13 which is proportional to the voltage applied to the load. As seen in the FIGURE 3 diagram, the time integral of this control voltage I is subtracted from the integral of $E_o$ so that $E_R T_1 = E_0 \cdot T_2 - I$. After saturable transformer 46 saturates, a voltage $e_{t2}$ is developed across resistor 47, and the flip-flop 50 is reset to the "0" state to start a new cycle.

During this reset period $T_2$ for integrator 40–2, the integrator 40–1 is being set in accordance with the operation of the FIGURE 1 inverter. For example, if the output of rectifier filter circuit 11 is high during $T_2$, the control voltage integral I from winding 23 will be proportionately higher. This delays the emptying of the integrator element, saturable transformer 46, and $T_2$ is extended. At the same time, integrator 40–1 is being set for a longer time. This increases the cycle time which reduces the pulse rate and therefore the average amount of power delivered to the load 12. In other words, variations in power applied to the load are reflected in proportionate variations in the cycle time and the inverter is frequency modulated.

The power circuit, including the electronic switches, controlled rectifiers 16 and 17 in the embodiment of FIGURE 1, together with the remaining circuitry external to FM gating circuit 14 are not affected by the stabilization process in any way except by the control of the times when the half cycles start, that is, when the switches 16 and 17 are closed. The power circuit is designed to delivery a train of power pulses to the load 12 having a nominal volt-time integral. The FM gating circuit 14 is designed to produce switching signals which alternately close controlled rectifiers 16 and 17 at a rate which produces a nominal average number of power pulses. The power pulses are of such a nature that they terminate before the end of each half cycle. This permits optimum power circuit efficiency. This efficiency is achieved by first, having the power switches turn themselves off and second, avoiding commutation or shunt currents. All known solid state switches have some non-negligible losses. In particular, forced turn off of a semiconductor carrying a substantial current results in significant power losses. This is avoided in the FIGURE 1 power circuit by having the capacitor 18 terminate, at time $T_t$, the current gradually. In addition, the power circuit is designed so that all the current taken from the source is used to drive the load. There are no currents in shunt with the load.

Inevitably, there are variations in the power applied to the load due to changes in load impedance, power source fluctuations, component temperature changes, etc. The FIGURE 1 stabilizer automatically compensates for these variations by varying the frequency of the pulses delivered to the load with FM gating circuit 14 which is responsive to the pulses actually delivered. Because the pulses are self terminating, the control function performed by gating circuit 14 is effectively independent of the power circuit operation. The power circuit is therefore designed for maximum efficiency. In the FIGURE 1 circuit, the switching losses are minimized, the capacitor 18 storage losses are negligible, and the transformer losses are made as small as the state of the art permits.

The effectively independent characteristics of the FM gate circuit 14 permits refined stabilization operation. This is particularly important in respect to ripple suppression. Stabilized inverters normally operate on volt-time integration of the input and output signals. This generally means that the ripple suppression characteristic is limited because while the average voltage is stabilized, variations in the r.m.s. values can remain. It has been found that operation of the FIGURE 1 inverter can be made to stabilize the output signals in accordance with the r.m.s. variation. If the output of rectifier-filter circuit 11 is a voltage $V_o + \Delta V$, where $\Delta V$ is the instantaneous voltage difference from the design value $V_o$, the variations in the control voltages induced in windings 37 and 38 are:

$$-2KV_o(\Delta V)$$

The object of this feature is to cancel the low frequency ripple effect by appropriate modulation of the FM gating circuit operation.

$$(\Delta V)/V_o \ll 1$$

For reasonable variations, this can be approximated by:
$$V^2 - 2V_o(\Delta V) = V_o^2 + 2V_o(\Delta V) + (\Delta V)^2 - 2V_o(\Delta V) \approx V_o^2$$
This relationship can be used in such a way that the FM gating circuit approximates rms. stabilization. Because $E_R$, $E_o$, etc. can be varied in accordance with the desired scale factors, FM gating circuit 14 is adjusted to provide non-proportionate effects from the variations in the control voltage $\Delta v$. While a $v_o$ control voltage produces the nominal half cycle time, the variations $\Delta v$ produce an effect which is actually proportional to $2\Delta v$.

This is a major advantage of the FIGURE 1 circuit. Normally, the rectifier-filter circuit 11 has substantial weight and size relative to all the inverter circuitry. This bulk is required for the purpose of providing effective filtering to minimize input ripple. While the output filter components for an inverter can be made smaller by operating the inverter at higher frequencies which result in smaller filter components, the frequency of supply source 10 is generally fixed at common values such as 60 and 400 c.p.s. Also, because of the efficient switching operations, the FIGURE 1 circuit can be operated at relatively high frequencies, normally in the 1–100 kc. range.

While the voltage stabilizer circuit has been described as utilizing controlled rectifiers as power switches because these devices are presently the most practical ones for overall power switching characteristics with the present state of the art, it is to be understood that the invention can utilize any switching device which can be incorporated in a power circuit whereby a train of nominally equal power pulses, initiated by turn on pulses, are delivered to a load in accordance with the invention. Similarly, quite different integrator circuits which perform the same integration function illustrated in FIGURE 3 can be employed.

While a particular preferred embodiment of the invention has been shown and described herein, it is not intended that the invention be limited to such disclosure, but that changes and modifications can be made and incorporated within the scope of the claims. For example, it is apparent that the FM gate circuit can be made responsive to additional stabilization signals such as those derived from circuit condition and the output signal level can be varied in accordance with a modulating signal by varying the amplitude of voltage $E_R$.

What is claimed is:
A self-stabilizing amplifier comprising:
(a) a power circuit including
    (1) a storage capacitor,
    (2) a first switching element coupling an input power source through said capacitor in series to a load,
    (3) a second switching element coupling said storage capacitor for discharge through said load,
    (4) said power circuit components being selected and interconnected in such a manner that, in response to out of phase switching signals turning said switching elements on to initiate alternate half cycles, the power circuit delivers self-terminating power pulses to the load; and
(b) a frequency modulating gate circuit including
    (1) a bistable multivibrator which applies turn on signals to said respective switching elements when switching between respective states,
    (2) integrator means, responsive to a control signal proportional to the signal applied to the load and reference signals, for determining the cycle duration by switching said bistable multivibrator between states,
(3) saturable transformers serving as the integrator elements,
(4) reference voltage sources for setting and resetting said integrator elements,
(5) switching elements responsive to said bistable multivibrator for coupling said voltage sources to said integrators, and
(6) said integrating means components being selected and interconnected in such a manner that variations in said control signal voltages produce cycle duration variations in accordance with the rms. voltage changes.

References Cited by the Examiner
UNITED STATES PATENTS

| | | | |
|---|---|---|---|
| 3,120,633 | 2/1964 | Genuit | 321—45 |
| 3,197,691 | 7/1965 | Gilbert | 321—18 |
| 3,219,906 | 11/1965 | Keller et al. | 321—16 |

OTHER REFERENCES

General Electric SCR Manual, second ed., 1961, pp. 135–137.

JOHN F. COUCH, *Primary Examiner.*

W. H. BEHA, *Assistant Examiner.*